July 12, 1938.  F. A. ISAACSON  2,123,362
MEANS AND METHOD OF SHIPPING AUTOMOBILE BODIES
Filed Oct. 2, 1936  6 Sheets-Sheet 1
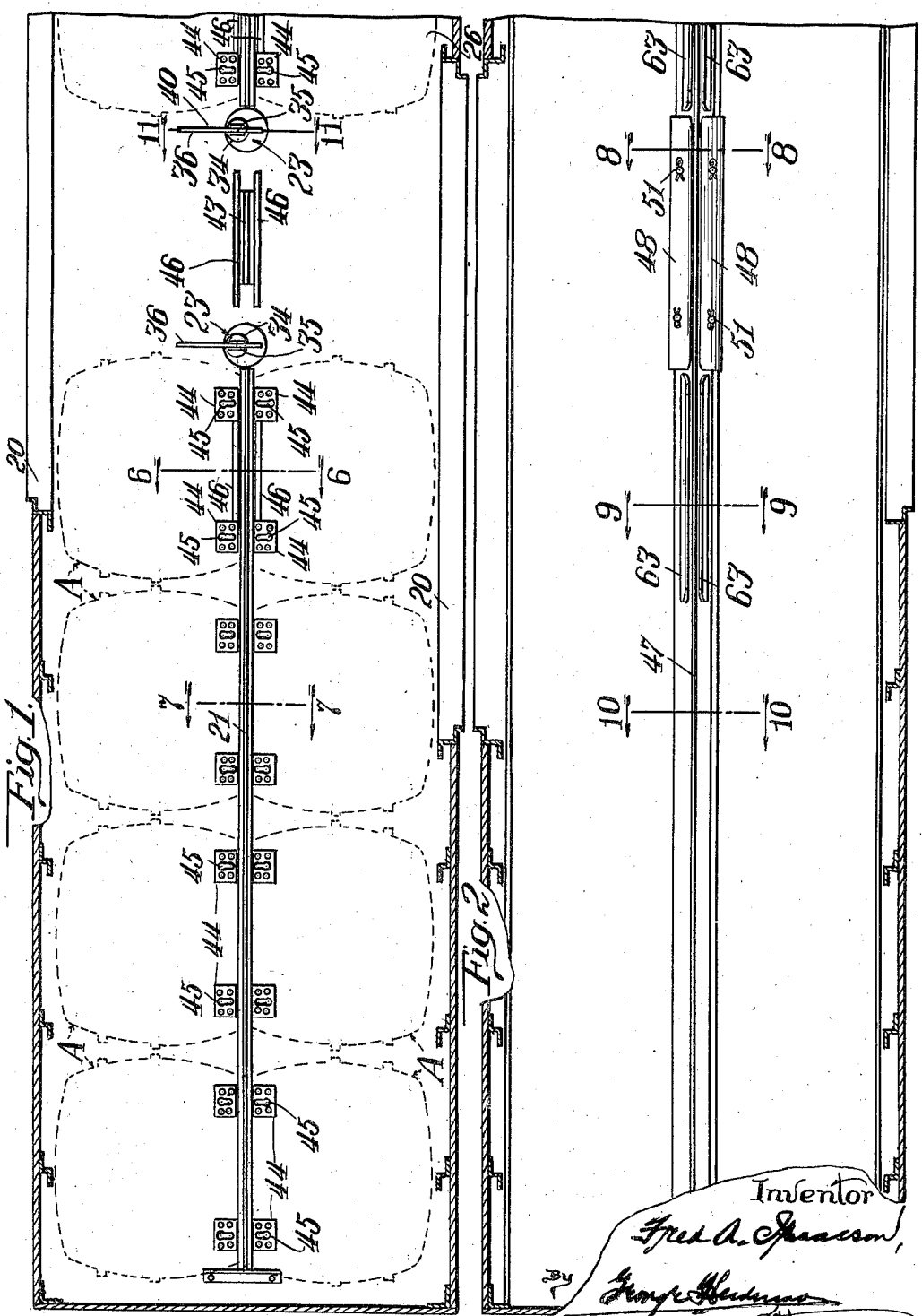

July 12, 1938.  F. A. ISAACSON  2,123,362
MEANS AND METHOD OF SHIPPING AUTOMOBILE BODIES
Filed Oct. 2, 1936  6 Sheets-Sheet 2
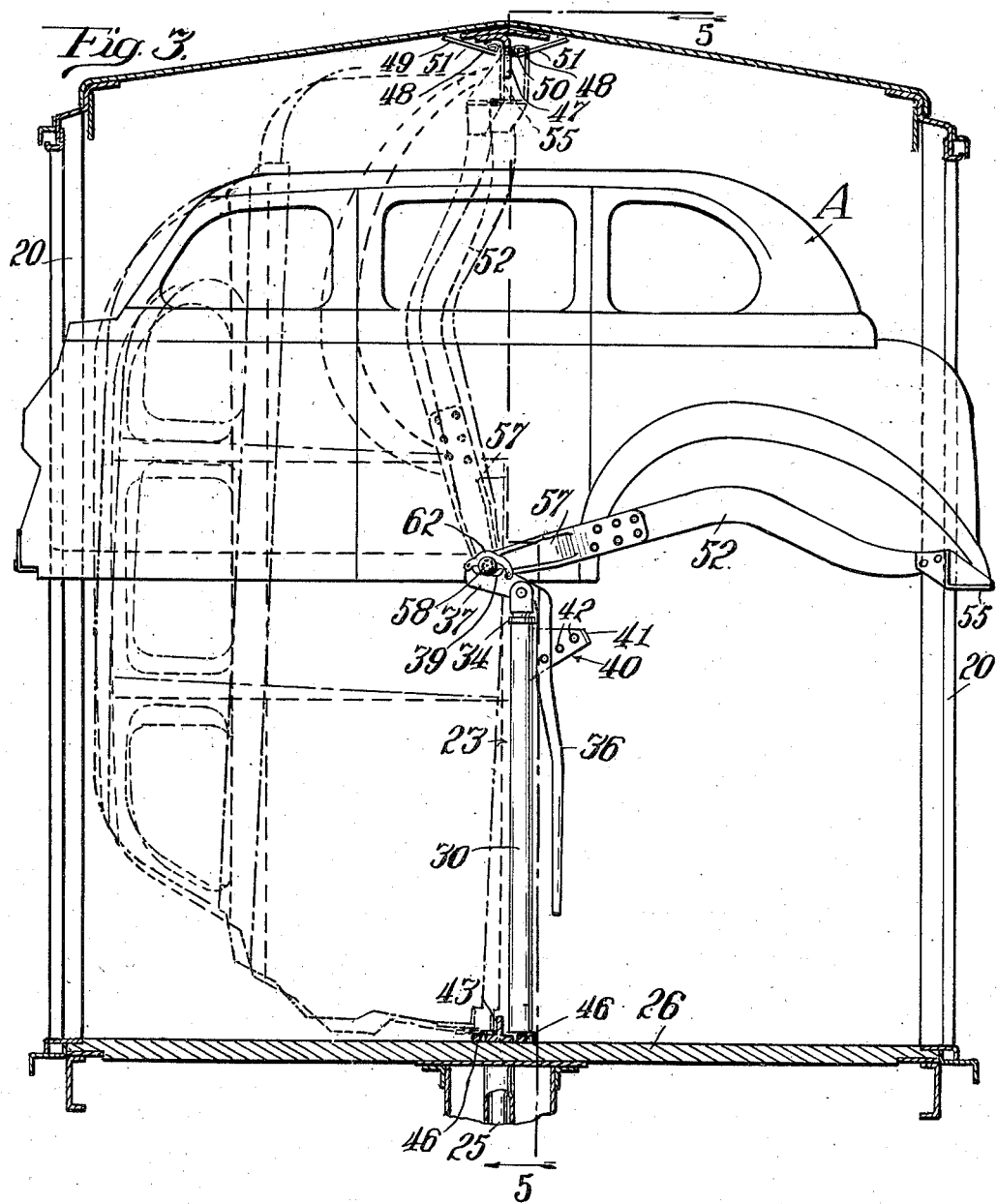

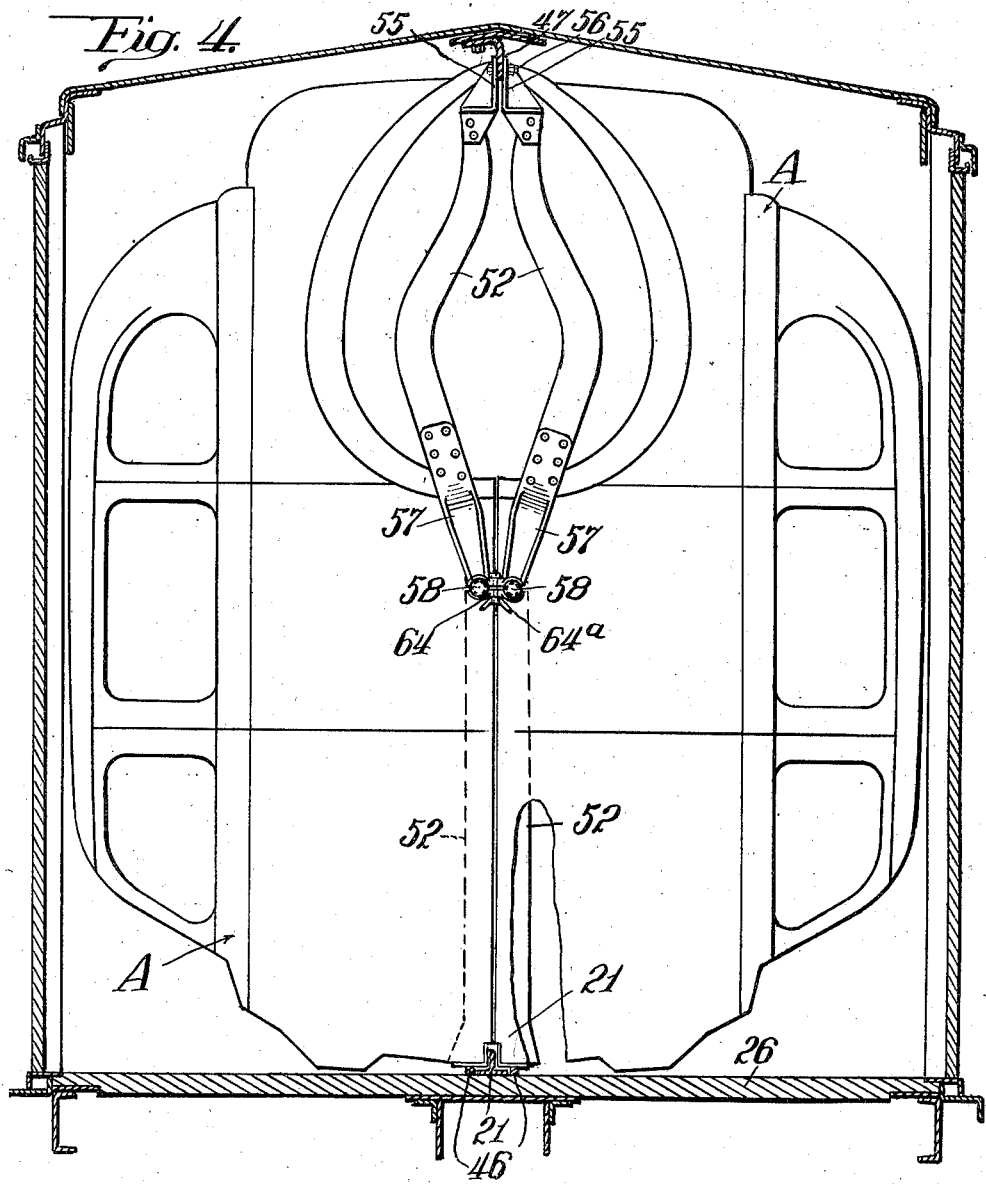

July 12, 1938.  F. A. ISAACSON  2,123,362
MEANS AND METHOD OF SHIPPING AUTOMOBILE BODIES
Filed Oct. 2, 1936  6 Sheets-Sheet 4
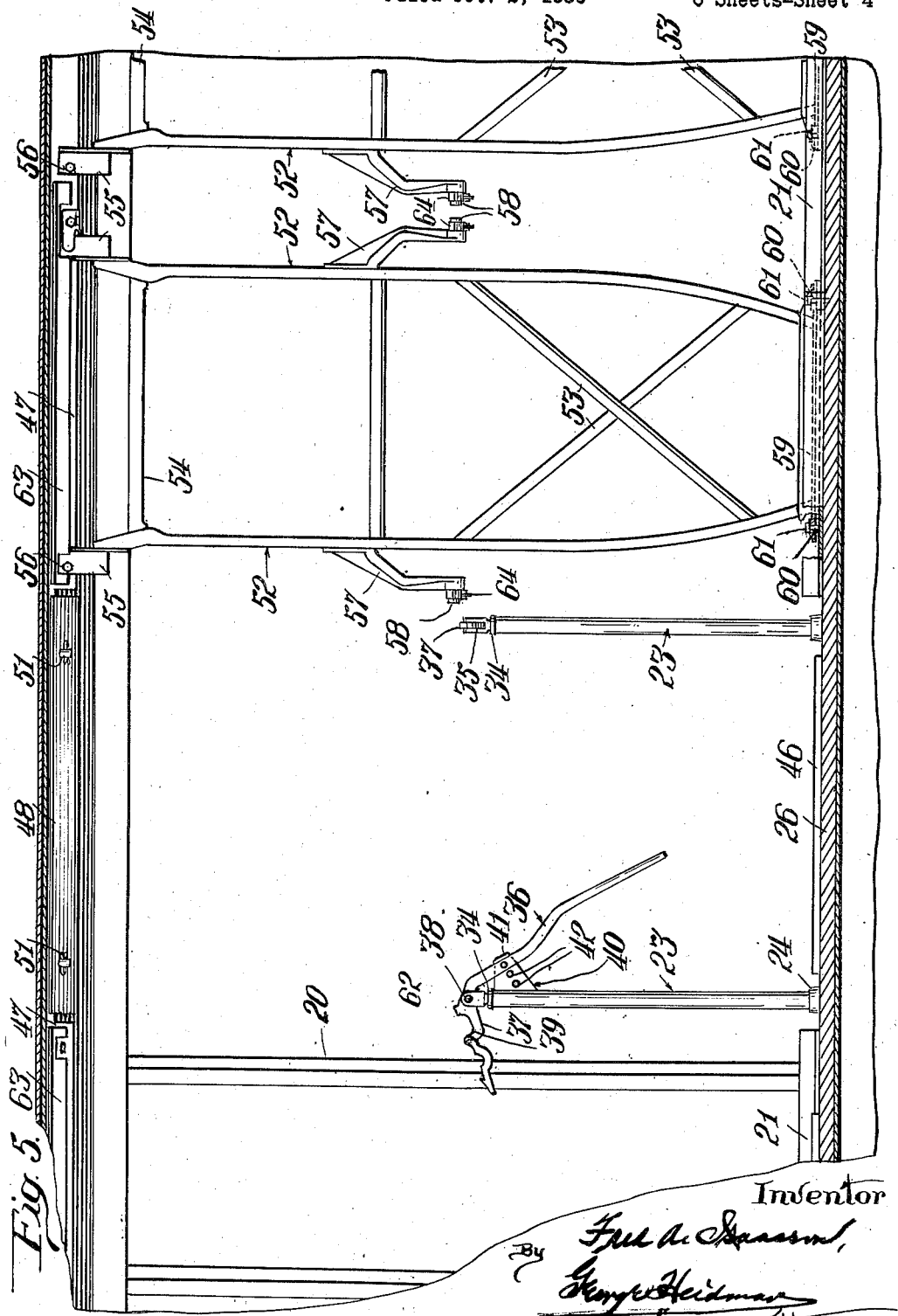

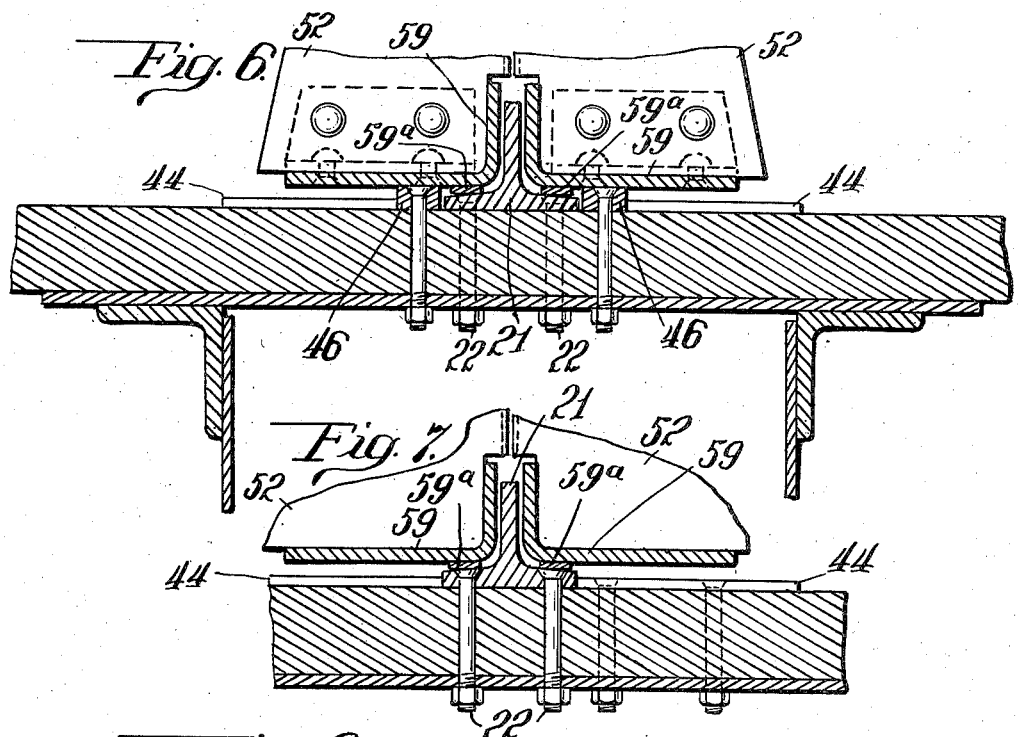
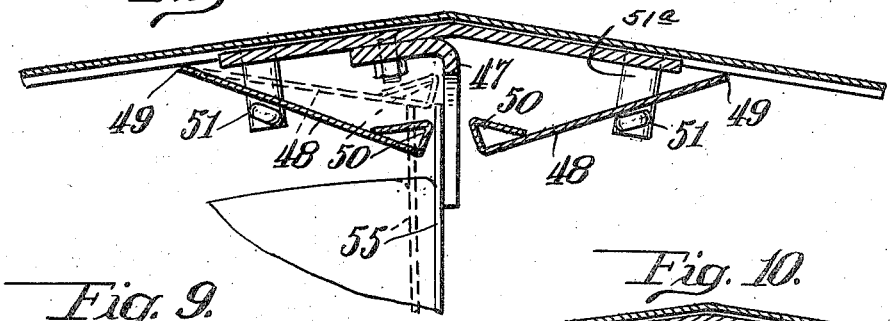
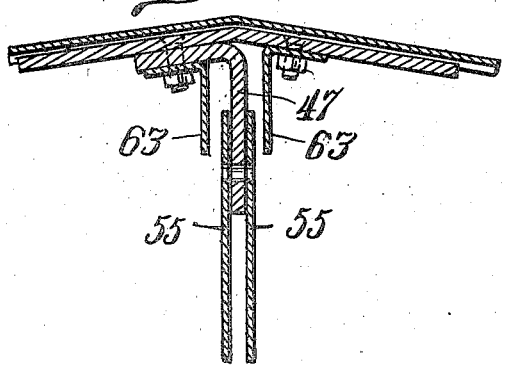
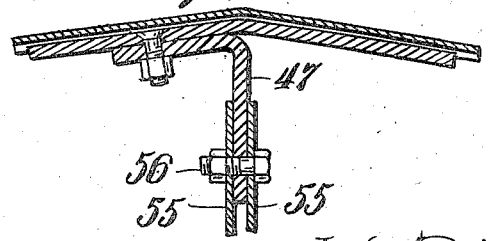

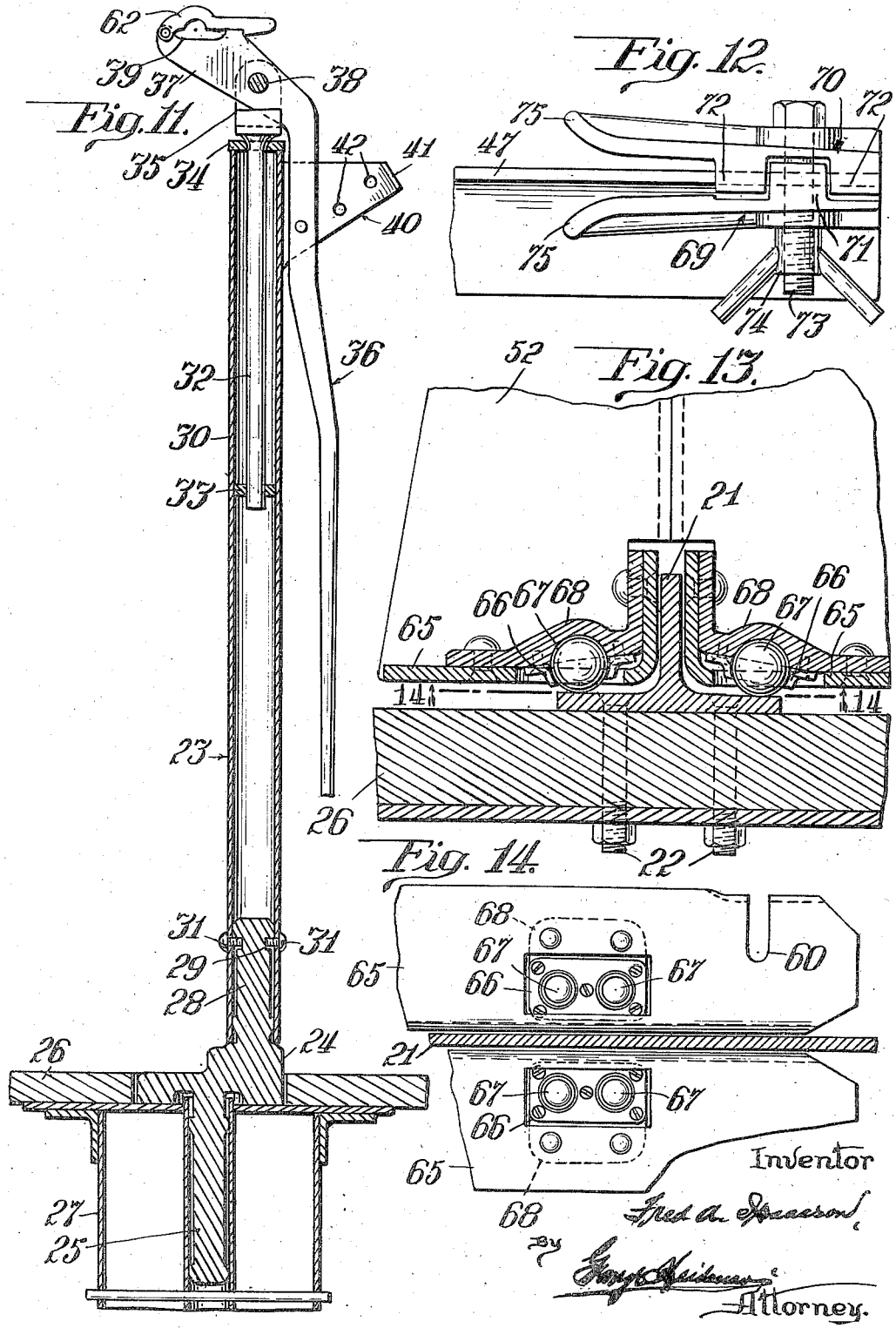

Patented July 12, 1938

2,123,362

UNITED STATES PATENT OFFICE 2,123,362

MEANS AND METHOD OF SHIPPING AUTOMOBILE BODIES

Fred A. Isaacson, Topeka, Kans.

Application October 2, 1936, Serial No. 103,686

31 Claims. (Cl. 105—368)

My invention relates more particularly to a method of shipping automobile bodies in a suitable closed vehicle or railroad car and involves means whereby the automobile bodies may be more readily manipulated and properly supported in vertical position in parallel relation on opposite sides of the longitudinal median line of the railroad car or other transporting conveyance; said means including mechanism whereby the automobile bodies after being brought into the railroad car or other conveyance may then be easily shifted in vertical position to the ends of the railroad car.

One of the principal objects of my invention is to provide means whereby a maximum number of automobile bodies may be loaded into a closed railroad car; and the automobile bodies rigidly held in their on-end positions to withstand the jars and vibrations encountered during the car movement.

The invention involves means of such nature that loading may be accomplished by a minimum number of individuals; and while the invention relates particularly to the loading of automobile bodies in a closed railroad car, in connection with which it is illustrated for purposes of exemplification, it will be understood that my improved means and method are applicable for use for loading automobile bodies on boats and other suitable conveyances, as well as for the storage of bodies in warehouses.

The objects and advantages of my invention will be more readily comprehended from the detail description of the accompanying drawings, wherein—

Figure 1 is a longitudinal sectional plan view of a portion of a closed railroad car provided with my invention.

Figure 2 is an inverted plan view of a portion of the top or ceiling of the railroad car.

Figure 3 is a cross sectional view taken at the door openings of a railroad car; the full lines showing an automobile body in the initial loading stage; one dotted line position showing the body practically swung into complete vertical position and ready to be lowered onto the guide and skid rails on the floor; while the other dotted line position shows the body in vertically locked position.

Figure 4 is a cross sectional view adjacent the end of the railroad car, illustrating the positions of two properly loaded automobile bodies and the mounting mechanisms locked together and secured to the ceiling rail.

Figure 5 is a vertical sectional view taken substantially on the line 5—5 of Figure 3 and looking in the direction of the arrows, with the automobile bodies in vertical position and moved beyond the body and frame lifting and positioning stanchions and illustrating the means employed for holding the upper ends of the paired frames at one of the sides.

Figure 6 is a detail sectional view taken on the line 6—6 of Figure 1, showing the lower portion of a pair of parallelly arranged frames and their relation to the guide and skid rails on the floor adjacent the center of the car.

Figure 7 is a detail sectional view taken on the line 7—7 of Figure 1.

Figure 8 is a detail sectional view taken on the line 8—8 of Figure 2, looking in the direction of the arrows.

Figure 9 is a detail sectional view taken on the line 9—9 of Figure 2, as viewed by the arrows and showing the upper ends of two body holding frames before same are fastened in place.

Figure 10 is a detail sectional view illustrating the method of fastening the upper bracket ends of two body holding frames to the top rail.

Figure 11 is a vertical sectional view of one of the body and frame lifting and positioning stanchions; the figure being taken substantially on the line 11—11 of Figure 1.

Figure 12 is a detail bottom plan view of a portion of the top rail and of a bifurcated member or forked element for spacing and holding the upper ends of a pair of on-end body holding frames at the sides disposed toward the ends of the car.

Figure 13 is a detail sectional view substantially similar to Figure 6 illustrating a modification of the lower end or guide rail engaging portion of the body supporting frame.

Figure 14 is an inverted sectional view taken on the line 14—14 of Figure 13 looking in the direction of the arrows.

The invention, for purposes of exemplification, is illustrated in connection with a suitable sized closed railroad car wherein the door openings indicated at 20, 20, see Figure 1, are arranged at points intermediate of the ends of the car and usually in somewhat offset relation; these door openings being provided with the conventional slide doors, not shown.

My improved method contemplates means whereby the automobile bodies may be moved longitudinally of the railroad car and supported in an on-end vertical position.

The railroad car floor, at the longitudinal median line, is provided with suitable track or guide rails 21 which in the particular exemplification are in the nature of inverted T-rails; the head portions being rigidly secured or bolted to the car-floor as indicated at 22 in Figure 7. The guide rail 21 extends from the ends of the car to points coincident with the door-openings so as to provide for trucking space transversely through the car, and also to permit installation of a pair of stanchions indicated generally at 23 in Figure 5. These stanchions, whereby the automobile bodies are lifted from the truck and swingingly positioned to properly align with the track or guide rails, both at the ceiling and on the floor of the car, each consist of a suitable casting having a floor engaging or base portion 24, provided with a depending post 25 adapted to extend through an opening in the car floor 26 and rotatably mounted in a suitable housing 27 secured beneath the car floor about the opening.

The base portions 24 of the castings are preferably countersunk in the floor, as more clearly shown in Figure 11, and are each provided on one side of the center with an upstanding post 28 which is shown with a circumferential groove 29. The upstanding post portions 28 are each provided with a tubular portion 30 of predetermined height which is secured to the post 28 against accidental removal by set-screws 31 which extend into groove 29. This tubular portion 30 is shown with a rod 32 held in position in any suitable manner as by spacer block 33 and top piece 34; with the upper exposed end of the rod 32 bifurcated at 35 to receive a suitable lift lever 36 therebetween. The lift or jacking lever 36 is of suitable length with its upper or head end 37 off set or disposed to one side, see Figure 11, and pivotally secured between the bifurcations 35 of rod 32 by means of pin 38. The upper surface of the head portion 37 is preferably provided with a socket as at 39 for the purpose of receiving suitable trunnion portions on the automobile body supporting frames and preferably held in place by a safety latch later to be described.

The stanchions are each provided with a bracket 40 having an end wall at 41 to limit the up-swing of the lever; the sides of the bracket 40 being suitably spaced apart to permit passage of lever 36 therebetween. The side walls of the bracket 40 are shown provided with spaced holes 42, with which a hole in lever 36 is adapted to register and to receive a suitable lock-pin whereby lever 36 may be locked in body supporting position; the spaced holes permitting locking of the lever when supporting different sized automobile bodies.

The stanchions with lift lever and lever locking pin are exemplifications of mechanical and rather rapid lifting mechanism, but other types of lifting devices or jacks may be employed if mounted in the car-floor to permit shifting to opposite sides of the median line of the car.

A pair of stanchions 23, in predetermined spaced relation, are similarly mounted in countersunk portions in the floor at points opposite the car door openings, (Figs. 1 and 5) with the depending post portions 25 of each stanchion base arranged in alignment with the bottom rails 21; (Fig. 3) the bottom rails 21 being cut away at the countersinks in the floor to permit the mounting of the stanchion bases. The floor, intermediate of the two stanchion bases, namely at a point opposite the door openings, is provided with a short T-rail section and plate 43, see Figure 1, held in place by bolts 22 in a manner similar to the main rails 21. The upstanding leg of the plate 43 terminates a distance from the stanchions in order to provide sufficient space for the wheels of the truck whereby the automobile body is brought into the railroad car.

The floor on opposite sides of the main bottom or guide rails 21 is shown provided with laterally extending floor or locking plates 44 arranged in pairs on opposite sides of the bottom rails 21. These floor plates are suitably secured to the floor and their ends preferably welded or otherwise integrally secured to the base of the floor guide rails 21. The floor plates 44 are spaced apart a distance approximating the width of the automobile body carrying frame structures and are each provided with a key-hole slot 45 extending at right angles to the rails 21 with the enlarged ends of the slots farthest removed from the rails, as shown in Figure 1; these slots being for the purpose of receiving frame locking pins or bolts hereinafter to be described.

The floor on opposite sides of the main guide rails 21 and adjacent thereto is provided with longitudinally disposed short rails or members 46, 46 which are suitably secured to the floor. These short rails are merely at the car loading point and at the adjacent or initially shifted points, and are intended to extend slightly above the plane of the base of guide rail 21, see Figure 6.

The ceiling of the car at the apex or longitudinal center line is provided with an angle bar 47; one side or leg whereof is secured to the ceiling or roof of the car while the other side or leg depends substantially at the longitudinal median line of the car, see Figures 8, 9 and 10. These top rails or angle bars extend from the ends of the car to points coincident with the door openings.

The space intermediate of the rails 47 and opposite the door-openings is provided with suitable trigger mechanism adapted to automatically lock the upwardly disposed ends of the chassis or body holding frame structure in upright and proper position relative to the top rails 47.

This trigger or automatic locking mechanism consists of the plates 48, 48 disposed on opposite sides of the longitudinal median line of guide rail 47 and at their upper ends bear against the ceiling of the car as at 49; the free or lower ends of the plates being gravity actuated. The free ends of the plates are bent into the angular formation shown at 50, to provide sufficient rigidity and an abutting surface for the upper ends of the chassis or body holding frame mechanism.

The depending or downwardly swung normal positions of the trigger plates 48, 48 are shown in full lines in Figure 8; the plates being supported in this position by bracket members 51a extending through a slot in the plates 48 and resting on pin 51.

The plates 48, 48, arranged on opposite sides of the longitudinal axes of the top rails 47, are adapted to swing upwardly into the dotted line position shown to the left in Figure 8 by the upward pressure of the upwardly moving end portions of the automobile chassis or body holding frame mechanism when the latter is being tilted vertically into engagement with the lower side of the plate 48. As soon as the upper end of the body holding frame mechanism is in vertical position and clear of the free end of the upwardly pressed plate, the latter will automatically drop into the full line position shown and thereby prevent the automobile body holding frame mechanism from tilting back in the direction from whence it was swung; while the plate 48 at the opposite side of the median line will prevent movement of the upper end of the frame mechanism in that direction.

My improved means contemplates either the use of the automobile chassis or a specially constructed frame mechanism simulating the chassis and consisting of side bars 52 provided with suitable renforcing bars as at 53.

Adjacent one end the frame mechanism is provided with a cross-bar 54 and the immediate ends of the side frame members 52 are provided with angle plates or brackets 55, 55 having portions disposed laterally beyond the ends of the main frame portions and these portions apertured to receive suitable fastening means or bolts as shown at 56 in Figure 5. These laterally disposed portions of the bracket members 55 are adapted to be disposed along the sides of the depending portion of the top rail 47 and the two finally positioned frames bolted to the rail and to each other, on the near side, as shown in Figure 10.

The side frame members 52 of the automobile body supporting structure, at a suitable point intermediate of their ends are each provided with an offset arm or bracket 57 securely fastened or riveted to the side members at one end, while the free end of the arm or bracket member 57 is disposed in spaced relation with the frame member 52 and provided with the laterally disposed trunnion or pivot providing pin portion 58, see Figure 5.

The bracket arms 57, 57 are offset from the side frame members 52 sufficiently to present the pivot pin portions 58 in a plane beyond the sides of the automobile body; and these pin or trunnion portions 58 also correspond to the spacing between the two stanchions 23, 23 and their lifting levers. The trunnions 58, which preferably are slightly flanged at their outer ends, are adapted to seat in the sockets 39 formed in the head portions 37 of the levers 36 of the two lifting stanchions.

The lower end of the chassis or frame structure is provided with a transversely disposed angle bar or plate 59, of length somewhat greater than the distance between the side frame members 52, 52. The angle bars or plates 59 are so secured to the ends of the frame members 52 that one side of the plates or bars will extend substantially parallel with the bottom rail 21, as shown in Figure 7, while the other sides are adapted to extend substantially parallel with the floor of the railroad car.

The lower sides of the angle bars 59 are provided with skid blocks or rails 59ª, see Figures 6 and 7, which are adapted to slide on the base portions of the floor guide rails 21 during the shifting of the body holding frame toward a car-end. As previously stated and as shown in Figure 6, the short guide rails 46 extend slightly above the base portions of main guide rails 21 on which the skid rails 59ª ride. It is apparent that after the body holding frame has been lowered by lift lever 36 and rails 59ª arranged on the base of the main rail, intermediate of guide rail 46 and the upstanding portion of main floor rail 21, that transverse movement of the frame away from main guide rail 21 is impossible. The short guide rails 46 need merely be employed in connection with plate and rail section 43 and in the adjacent portions or zones of the guide rails to which the body holding frames are slid from the initial loading zone so as to hold the lower ends of the frames in place until a pair of body holding frames have been brought into parallel bottom-to-bottom relation and fastened together.

The extended ends of the plates or bars 59 are each provided with a transversely disposed slot at 60, see Figure 5, intended to receive a holding pin or bolt 61, whose head is inserted into the key-hole slot 45 in the floor plates 44 with the pin disposed upwardly through the slots 60 in the ends of bars 59 after the frame mechanism with attached automobile body has been slid into its final loaded position in the car.

The angle bars or plates 59 at the lower ends of the up-ended body holding frame structures also act as skids and slide lengthwise of the short guide rails 46 initially.

In practice, the automobile bodies A are secured to the racks or frame structures involving the side frames 52 with the bracket arms 57, with the skid plate 59 disposed across the dash-board end of the automobile body; while the angle plates 55 are disposed beyond the other or rear end of the automobile body.

These racks or frame structures may consist of the chassis members of automobile bodies or they may be specially constructed to permit adjustments in order to accommodate themselves to modifications or differences in automobile body construction.

The automobile body with the frame structure attached is rolled into the car by a suitable truck so that the trunnion ends of bracket-arms 57 will be disposed adjacent the stanchions 23; it being understood that the body is placed intermediate of the two stanchions 23. The levers 36 of both stanchions 23 are then tilted about their pivots 38 to position the sockets 39 of the lever-heads beneath the trunnions 58 of both bracket arms 57; the levers 36 then being lowered thereby jacking or lifting the automobile body and frame structure off the truck, permitting the latter to be removed from the car. With the type of automobile body shown, the levers 36 are lowered into substantially parallel relation with the stanchions and are locked in this position by means of suitable pins inserted through the registering holes in the lever and in the bracket 40. This initial loading position of the automobile body is shown in full lines in Figure 3, namely with the body and supporting frame structure in substantially horizontal position transversely of the car at the door-openings where the ends of the body and of the frame structure can extend beyond the car side walls. The heads 37 of the levers 36 are each preferably provided with a suitable latch plate 62 adapted to swing across the trunnions 58 of bracket arms 57 to prevent possibility of the trunnions accidentally slipping or jarring out of the sockets in the heads of the levers; any suitable method for locking the latch plate in latching position may be used.

The frame structure with attached automobile body is then swung into vertical position with the dashboard end disposed downwardly as shown in dotted lines in Figure 3.

With the automobile body initially positioned as shown in Figure 3 where the dash-board end is at the left side of the railroad car, when the body is up-ended or tilted in the manner stated, namely with body nosing downwardly, the angle bar or skid plate 59 across the dashboard end of the frame structure will strike the upstanding web portion of the floor member 43 and prevent further swing of the lower end of the frame structure, with attached automobile body, toward the right in Figure 3.

During this tilting movement of the body and frame structure, the upwardly extended ends of the angle members 55 will engage the trigger member or swinging plate 48 on the car ceiling disposed to the right of the median line of the car as viewed in Figure 3, and force the trigger member upwardly out of the way. The angle members 55, after moving beyond the lower end of the trigger member 48 butts against the lower end of the plate or trigger member 48 located to the left of the median line of the ceiling and prevents further swinging movement of the upper end of the body and frame structure. As soon as the angle members 55 have been moved past the lower end of the initially engaged trigger member 48, the lower end of the latter drops down into normal position thereby holding the upper ends of angle members 55 of the frame structure between the two trigger members 48 as shown in full lines in Figure 8, where the introducing position is shown in dotted lines.

This trigger or automobile locking mechanism, as previously stated, is arranged on the ceiling intermediate of the ends of the top rails 47 and above the space intermediate of the stanchions.

With the angle plates 55 at the upper end of the body holding frame arranged between the trigger plates as described, the stanchion levers 36 are then raised and the frame lowered so the skid bar 59ᵃ engages the main rail 21 rearward of the short guide rail 46 thereby holding the lower end of the frame against lateral movement.

The automobile body holding frame structure positioned as just described is then ready to be slid into the adjacent zone or section where the ceiling is provided with the additional angle bars 63, 63 arranged in spaced relation with opposite sides of the ceiling guide rail 47, see Figure 9. The angle bars 63, 63 are arranged just beyond the ends of trigger plates 48. The body holding frame remains in this zone until a second body holding frame has been introduced in bottom-to-bottom relation. The paired body holding frames are then ready to be slid toward either end of the railroad car. In order to permit the body holding frame to be slid toward a car end, the stanchions, which are eccentrically arranged on their base portions 24, see Figure 11, are swung through the arc of a circle, disposed about the depending stems 25, into a position out of alignment with the bottom rail.

The next automobile body is then brought into the car with its nose or dash-board end disposed in a direction opposite to that of the body shown in full lines in Figure 3; and the stanchions are swung to the side of the car median line opposite to that disclosed in Figure 3, so that the head ends of the levers 36 will be disposed toward the right in Figure 3.

The initial loading operations are the same as heretofore described, except that the angle plate 59 at the nose or dash-board end of the frame structure will now engage the right side of the upstanding web of the plate member 43; while the angle members 55 at the upper end of the frame structure will first engage the trigger member or plate 48 to the left of the median line of the ceiling as viewed in Figure 3, forcing the plate upwardly until they pass the free end of the plate and abut against the free end of the plate 48 on the right hand side as viewed in Figure 3, at which time the first mentioned plate will drop down and lock the upper frame members 55 between the two gravity actuated plates.

The stanchion levers 36 are then raised and this automobile body and frame structure lowered so that its skid plate 59ᵃ rests on the guide rail 21 rearward of the guide and skid rail 46 located to the right of the floor rail.

The stanchions are then swung so as to move the heads of the levers out of the path of the frame, thus permitting the body and frame structure to be slid toward the same end of the car to which the first mentioned body was slid but on the opposite side of the car median line and into the same plane transversely of the car, or bottom to bottom relation illustrated in Figure 4; the body holding frame being slid into the adjacent zone, containing depending angle plates 63, 63, where it is fastened to the previously positioned frame.

Where the top guide rails merely involve the single angle bars 47, some means, like the short angle plates 63, 63, must be provided whereby the frame with attached automobile body will be maintained in upright position when shifted beyond the zone containing the trigger mechanism 48, 48. The short angle bars 63 are arranged in parallel spaced relation to provide a slot-way therebetween adapted to receive the upstanding portions 55 at the upper end of the body holding frame, which has been slid out of contact with the trigger mechanism to permit introduction of another frame with attached automobile body which is handled as previously described.

Before the frames are shifted farther toward the ends of the car, the two frames with attached bodies are locked together by suitable clamps 64 which may consist of two complementary socketed plates adapted to fit about the trunnions 58, 58 of the two frames and held together in any suitable manner, as for example by means of a bolt and butterfly nut as at 64ᵃ in Figure 4.

The two frames thus locked together against tipping are then shifted to their final positions in the car, where the frames are locked to the floor plates as previously described.

The floor plates 44 are so positioned that the notched or slotted ends of the lower or skid plates 59 of the frame structures will register with the keyhole slots in the floor plates 44 when the bodies have been slid into final position; the skid plates then being secured to the floor-plates by means of suitable bolts or pins and nuts as previously described.

In Figures 13 and 14 I illustrate a modification of the skid plate or angle member secured to what ultimately is the lower end of the body holding frame, namely a construction which may be substituted for the skid plate 59; the balance of the frame being the same; a portion of the side frame being shown at 52.

In Figure 13 the angle end plate 65—one being shown on each side of the floor rail 21—is provided with an opening and anti-friction or ball bearing holding cup member 66 adapted to permit the balls 67 to protrude therethrough; the cup member 66 with the balls 67 being held in place by the cupped top or cover plate 68 which is disposed across the opening in the angle plate 65 and secured to plate 65. The balls 67 are positioned where they will rest on the flanges or base of the floor guide rail 21.

As previously stated, the near side of a pair of finally loaded or placed body holding frames, as viewed for example in Figure 4, are secured to the top rail 47 by bolt 56; the top rail at spaced intervals being provided with suitable openings. The two bottom-to-bottom automobile bodies practically take up the entire width of the car as shown in Figure 4, thus making it impossible to have access to the far side of the loaded frames and for that reason I provide the forked holding means shown more clearly in Figure 12 for the purpose of effecting a gripping engagement with the upper ends 55 of both frames while being slid into place. This means consists of a pair of complementary plates 69 and 70 adapted to be disposed on opposite sides of the top or ceiling rail 47; the main body portions of the plates being preferably of greater width than the depending leg of the top rail so that the transversely disposed lug 71 of member or plate 69 may mesh or interengage with the spaced lugs 72, of plate 70 beneath guide rail 47 as shown in Figure 12. The plates are apertured to receive pin or bolt 73 which receives nut 74 whereby the two plates are securely clamped together and into clamping relation with the guide rail 47, the lugs maintaining the desired spacing between the fore ends of the plates. The free end of each plate is formed to flare or curve laterally away from the guide rail 47 as shown at 75.

In view of the inaccessability to the farthest side of the frames after they are slid away from the car door openings, a pair of the holding plates 69, 70 are first secured to the top guide rail 47 at the end of the car. When a pair of positioned frames 52 with attached automobile bodies are slid toward the car end, the flange plates 55 at the upper ends of both frames will be engaged by the flared ends 75 of the clamp plates 69—70 and cause the plates 55 of the frames to ride into the restricted space between the plates until plates 55 engage the lug 72. The clamp plates 69—70 will firmly hold the upper ends of both body holding frames against any sidewise movement.

After the first pair are in final position, the near side of the pair of frames are then bolted to the top rail as shown in Figure 10. A second set of clamp plates 69—70 are then secured in place by passing bolt 73 through the next bolt-hole in the top rail 47; the clamp plates 69—70 also constituting means for maintaining proper spaced relation between the successive pairs of frames in order that damage to the automobile bodies will not occur. It will be understood that a pair of clamp plates 69—70 are preferably employed between the different pairs of body holding frames; the clamp plates readily permitting the paired frames to be slid toward the car doors, away from the clamp plates, during unloading operation, after the other holding bolts 56 at the top near side and bolts 61 at the bottom have been removed.

The invention has been exemplified in connection with a closed railroad car but it will be understood that it is equally applicable for use in connection with any other suitable closed vehicle or chamber; and while I believe the drawings set forth the best embodiments of the invention, modifications in certain respects may be possible without, however, departing from the spirit of my invention.

What I claim is:

1. Means for shipping automobile bodies comprising, in combination with a closed transporting vehicle, an upstanding floor rail disposed lengthwise of the vehicle; a depending ceiling rail disposed lengthwise of the vehicle; body supporting frame structures provided at one of the ends with slide plates adapted to slide lengthwise on one side of the base of the floor rail, while the other ends of said frame structures are provided with ceiling rail engaging portions, said frames being adapted to be positioned on opposite sides of the ceiling rail and the floor rail in opposing relation whereby automobile bodies are supported in vertical position and in bottom to bottom relation on opposite sides of the floor and ceiling rails; and means whereby the opposing frame structures are locked to each other and in place.

2. Means for shipping automobile bodies comprising, in combination with a closed transporting vehicle, guide means mounted at the longitudinal median line of the vehicle floor and at the longitudinal median line of the vehicle ceiling, body holding frames provided with end members adapted to engage the guide means on the floor and the guide means on the vehicle ceiling, said frames being adapted to be moved into parallel relation on opposite sides of the guide means and thereby hold the automobile bodies in vertical position; and means whereby a pair of the body holding frames may be locked together in parallel relation on opposite sides of the longitudinal median line of the vehicle.

3. Means of the character described comprising, in combination with a closed vehicle provided with guide rails lengthwise of the floor and of the ceiling, the floor guide rail at predetermined spaced points and on opposite sides of the rail having locking portions, a plurality of automobile body holding frames provided at one of the ends with floor guide rail engaging members having portions adapted to match said locking portions, while the other ends of said frames have ceiling rail engaging members, means whereby said floor rail engaging members may be locked to the locking portions of the floor rail, and means whereby said frames may be locked together in parallel relation and on opposite sides of the guide rails.

4. Means of the character described comprising, in combination with a closed vehicle provided with guide means disposed lengthwise of the vehicle floor so as to permit automobile bodies to be arranged on opposite sides thereof, frame structures adapted to have automobile bodies secured thereto and to support the bodies on end in vertical position, said frame structures having bottom end portions adapted to engage and to slide on said guide means, and means secured to the vehicle top adapted to engage the upper ends of said frame structures to maintain them in vertical on end position whereby the automobile bodies are held on opposite sides of the longitudinal median line of the vehicle in bottom to bottom relation.

5. Means of the character described comprising, in combination with a closed vehicle having a loading opening and provided with longitudinally disposed guide means on the floor, automobile body frame structures adapted to be disposed vertically from the floor to the vehicle top with the lower ends in engagement with said guide means, means secured to the vehicle top adjacent the vehicle loading opening adapted to automatically effect locking engagement with the upper ends of said frame structures, and nonmovable means secured to the vehicle top at the ends of the last mentioned means for maintaining the frame structures in vertical position after the latter are moved longitudinally of the vehicle beyond the loading opening.

6. Means of the character described comprising, in combination with a closed vehicle provided with guide means disposed lengthwise of the floor and guide means disposed lengthwise of the vehicle top, automobile body holding frames adapted to be disposed vertically and to hold the automobile bodies on end in vertical position on opposite sides of said floor and top guide means in parallel bottom to bottom relation, and means whereby the frames are locked against movement.

7. Means of the character described comprising, in combination with a closed vehicle provided with guide means disposed lengthwise of the floor, guide means disposed lengthwise of the vehicle top, and slide rails disposed lengthwise of the vehicle on each side of the floor guide means, automobile body holding frames provided at the lower ends with slide rail engaging portions having apertured ends and at the upper ends with portions adapted to engage the guide means of the vehicle top, said frames being adapted to support the automobile bodies on end in vertical position and in parallel bottom to bottom relation on opposite sides of the guide means at top and bottom, slotted plates secured to the floor on opposite sides of the guide means in predetermined spaced relation, and locking elements adapted to engage said apertured ends at the lower ends of said holding frames and said slotted plates.

8. Means of the character described comprising, in combination with a closed vehicle provided with guide rails disposed lengthwise of the floor and of the top, vertically disposed stanchions provided with eccentric base portions rotatably mounted on the floor at the longitudinal median line of the car so as to cause the stanchions when rotated to move to opposite sides of the median line of the guide rail on the floor and each provided with a frame lifting lever pivotally secured thereto, the upper end of the lever being off-set to extend to the opposite side of its pivot, automobile body holding frames having end portions adapted to engage the sides of the guide rails at the floor and at the top of the vehicle, said frames on opposite sides and intermediate of the ends having laterally extending trunnions adapted to be engaged by the upper ends of said levers whereby the frames with attached bodies are initially pivotally supported above the vehicle floor and then rotated to vertical position adjacent the guide rails, the rotation of the stanchions to one side of the floor guide rail permitting the positioning and movement of the frames in engagement with the opposite sides of the guide rails.

9. Means of the character described comprising, in combination with a closed railroad car having door openings in the sides and provided at the longitudinal center of the car with guide rails arranged on the floor and on the car ceiling intermediate of the door openings and the car ends; automobile body holding frames adapted to extend from floor to ceiling and to engage the sides of the guide rails; a pair of vertically disposed automobile frame lifting stanchions eccentrically mounted on the floor opposite the door openings and at the longitudinal center of the car adapted to be rotated to opposite sides of and out of longitudinal alignment with said floor guide rail, said stanchions being adapted to swingingly support said frames off the floor to enable each frame to be swung into a vertical position parallel with one side of the guide rails and in engagement therewith; and stop means opposite the door openings adapted to prevent swinging of the frames beyond a predetermined vertical plane.

10. Means of the character described comprising, in combination with a closed railroad car having door openings intermediate of the ends and provided at the longitudinal center line with guide rails on the floor and on the car ceiling extending from points opposite the door openings to the car ends; automobile body holding frames adapted to be disposed vertically in planes parallel with opposite sides of the floor and ceiling guide rails; a pair of vertically disposed stanchions eccentrically and rotatably mounted in the car floor, in spaced relation intermediate of the floor guide rails, adapted to be rotated to opposite sides of the median line of said floor guide rails, said stanchions being adapted to initially swingingly support the body holding frames to permit the latter to be swung into vertical positions parallel with and into engagement with the sides of the guide rails; and stop mechanism arranged opposite the car door openings whereby the upwardly swung frames are held in vertical position.

11. In means of the character described, the combination with a closed railroad car having door openings intermediate of the ends and provided with guide rails disposed lengthwise of the car intermediate of the door openings and the car ends and along the median lines of the car floor and the car ceiling; automobile body holding frames adapted to extend from floor guide rail to ceiling guide rail and be disposed in vertical planes parallel with the sides of said rails; of a pair of vertically disposed stanchions rotatively and eccentrically mounted in the floor opposite the door openings in alignment with the floor guide rails, said stanchions when rotated being adapted to move to opposite sides of the median line of said guide rails; a frame lift lever pivotally secured to the upper end of each stanchion so as to oscillate vertically and swingingly support an automobile body holding frame to permit the latter to be swung into vertical position parallel and in engagement with one side of the guide rails; and means whereby the levers may be locked in load supporting position.

12. In means of the character described, the combination of a closed railroad car having door-openings intermediate of its ends and provided with upstanding guide rails along the longitudinal median line of the floor between the door-openings and the ends of the car and depending guide rails along the longitudinal median line of the car-ceiling between the door-openings and the car ends; a pair of plates tiltably secured to the ceiling on opposite sides of the median line thereof with their free ends disposed toward the vertical plane of the ceiling guide rails; automobile body holding frames adapted to be disposed vertically on opposite sides of the guide rails; and frame lifting means rotatably mounted in the car-floor opposite the door-openings whereby the body holding frames are swingingly supported so as to be swung into vertical position to either side of the longitudinal median line of the car and their upper ends caused to move between said pair of plates and thereby held in upright position.

13. Means of the character described comprising, in combination with a closed railroad car provided with guide rails along the floor and the ceiling, automobile body holding frames adapted to extend from floor guide rail to ceiling guide rail and thereby hold the automobile body in up-ended vertical position, said frames being adapted to be positioned in parallel relation on opposite sides of the guide rails, the ends of said frames being adapted to be locked to the guide rails while the paired frames may be locked to each other; and means whereby the adjacent paired frames with their attached automobile bodies may be locked in predetermined spaced relation.

14. In combination with a closed freight car provided along the ceiling and the floor with longitudinal guide rails; automobile body holding frame structures adapted to be arranged vertically in engagement with the floor rail and the ceiling rail and composed of a pair of side members, a supporting bar secured transversely to the lower ends of the side members adapted to slide along one side of the floor guide rail, extended portions at the upper ends of the side members adapted to lap the side of the ceiling guide rail, and a trunnion providing bracket-arm secured to each side member intermediate of the ends with the free ends of said bracket arms disposed laterally to provide trunnions whereby the frame structures may be lifted and swung into vertical position.

15. Means of the character described involving a closed freight car provided with guide rails along the longitudinal center of the ceiling and along the longitudinal center of the floor; chassis simulating frame structures adapted to hold automobile bodies and to be disposed vertically in planes parallel with the sides of said guide rails, a supporting bar secured transversely to the lower end of each structure beyond the end of the automobile body whereby the structure with attached automobile body may be slid along the floor guide rail, extended portions at the upper ends of said structures adapted to engage the ceiling guide rail, bracket-arms secured to said structures intermediate of the ends and disposed laterally; and means adapted to engage the free ends of the bracket-arms of a pair of parallelly arranged frame structures to thereby lock said pair of structures together in up-ended position.

16. Means of the character described comprising, in combination with a closed vehicle provided with guide means disposed longitudinally on the floor and along the car ceiling, automobile body holding frames adapted to be disposed vertically with the ends in engagement with both of said guide means, and means secured to the vehicle top adapted to automatically effect holding engagement with the upper ends of said frames.

17. Means of the character described comprising, in combination with a closed vehicle provided with guide rails disposed longitudinally on the floor and guide rails disposed longitudinally along the vehicle top, automobile body holding frames adapted to be disposed vertically on each side of said guide rails, and means detachably secured to said top guide rails adapted to effect gripping relation with the upper ends of a pair of parallelly arranged body holding frames.

18. Means of the character described comprising, in combination with a closed vehicle provided with guide rails disposed longitudinally on the floor and guide rails disposed longitudinally along the top, said top and bottom guide rails at prearranged spaced intervals having bolt receiving apertures, automobile body holding frames adapted to be disposed vertically and provided at their ends with guide rail engaging portions, and means detachably secured to the top guide rails adapted to effect gripping relation with the upper approaching ends of a pair of parallelly arranged frames whereby the latter are held against lateral movement and longitudinal movement toward the ends of the car.

19. Means of the character described comprising, in combination with a closed vehicle provided with guide rails disposed longitudinally on the floor and along the interior top of the vehicle, gravity control means arranged on the interior top intermediate of the opposing ends of the top guide rails, and automobile body holding frames adapted to be disposed vertically on ends in engagement with and on opposite sides of the guide rails, the upper ends of said frames having extensions adapted to automatically effect holding engagement with said gravity control means to prevent lateral movement of the frames.

20. Means of the character described comprising, in combination with a closed vehicle provided with guide rails disposed lengthwise of the floor and lengthwise of the vehicle top, slide rails on opposite sides of the floor guide rail, automobile body holding frames adapted to be disposed vertically in a plane parallel with and in engagement with the guide rails, each frame being provided at the lower end with a bar adapted to be disposed intermediate of a slide rail and the upstanding floor guide rail whereby the lower ends of said frames are held against movement in a direction transversely of the vehicle while permitting movement longitudinally of the vehicle, and means whereby the upper ends of the frames are held against lateral movement.

21. Means of the character described comprising, in combination with a closed railroad car provided with guide rails along the floor and along the ceiling at the longitudinal center line thereof, automobile body holding frames adapted to hold the bodies in up-ended vertical position, said frames being adapted to be positioned in parallel relation on opposite sides of the guide rails and the ends of said frames adapted to be locked to the guide rails; means cooperating with the ceiling rail for gripping the upper ends of a pair of parallelly arranged frames and to hold the latter against lateral movement and movement toward the car ends, and means cooperating with the body holding frames whereby the paired body holding frames are locked together.

22. In means of the character described, the combination of a closed railroad car provided with door openings; means disposed lengthwise of the car floor and lengthwise of the car ceiling substantially in the same vertical plane; and automobile body holding frames adapted to be disposed vertically in planes parallel and in engagement with said means and to hold automobile bodies on end; said means being adapted to guide the movement of the vertically disposed frames lengthwise of the car.

23. Means of the character described comprising, in combination with a closed railroad freight car having door openings; rails arranged lengthwise of the car floor and lengthwise of the car ceiling substantially in the same vertical plane; automobile body holding frames adapted to be positioned in planes substantially parallel with the plane of said rails and to hold the bodies on end in vertical position, the frames being provided with portions adapted to engage the sides of said rails and to be guided thereby in movement lengthwise of the car; and means whereby the body holding frames may be secured to the guide rails against movement.

24. Means for shipping automobile bodies comprising, in combination with a closed railroad car provided with side doors; means disposed lengthwise of the car floor intermediate of the side doors and the car ends; means disposed lengthwise of the car ceiling intermediate of the side doors and the car ends and substantially in the same vertical plane as said first means; automobile body holding frames adapted to be disposed vertically in planes parallel with said floor means and said ceiling means and to hold the automobile bodies on end; said floor means and said ceiling means being adapted to guide the movement of the frames lengthwise of the car; stop means arranged on the car floor opposite the doors in alignment with said floor means adapted to engage the lower ends of said frames; slot providing elements arranged on the car ceiling opposite the doors adapted to receive the upper ends of said frames; said stop means and said elements being adapted to maintain a body holding frame in position to be moved into engagement with said floor means and said ceiling means; and means whereby the up-ended frames may be held in vertical position.

25. Means of the character described comprising, in combination with a closed railroad car having side doors and provided with guide means lengthwise of the car floor so as to permit automobile bodies to be arranged vertically on opposite sides thereof; automobile body holding frames adapted to support the bodies on end in vertical position, said frames having portions adapted to engage and to slide on said guide means; and means secured lengthwise of the car ceiling adapted to engage the upper ends of said frames to maintain them in vertical on-end position, the portion of said ceiling means opposite the car side doors being tiltably mounted to permit the upper end of an automobile body holding frame to move into vertical position and said means then to automatically return to normal position and thereby hold the automobile body holding frame in position to be slid lengthwise of said guide means.

26. Means of the character described comprising, the combination of a closed railroad car provided with side doors and guide means disposed longitudinally along the car ceiling and the car floor in substantially the same vertical plane, a portion of said means opposite the side doors being vertically yieldable against pressure in one direction; and automobile body holding frames adapted to extend vertically from floor to ceiling in sliding engagement with the guide means so as to be guided in the movement of the frames lengthwise of the car; said yieldable portion of the guide means being adapted to automatically return to normal position and thereby hold the up-ended frame in vertical position and permit it to be moved lengthwise of the car.

27. Means of the character described comprising the combination of a closed railroad car provided with guide means disposed lengthwise on the car ceiling and on the car floor in substantially the same vertical plane; automobile body holding frames adapted to extend vertically from floor to ceiling in planes substantially parallel with and in sliding engagement with said guide means whereby the vertically disposed frames will be guided in movement lengthwise of the car; and means, adapted to be removably secured to said guide means, arranged to effect holding engagement with the approaching sides of the successive frames and to maintain the successive frames with the automobile bodies in spaced relation.

28. In means of the character described, the combination of a closed vehicle, means arranged substantially along the longitudinal center line of the vehicle; frame elements adapted to have automobile bodies secured thereto to hold the latter on end, said elements being arranged to extend beyond the ends of the automobile body, the lower ends of the frame elements being adapted to cooperate with said means to thereby hold the frame elements against movement transversely of the car; means disposed along the vehicle ceiling substantially at the longitudinal center line of the vehicle and adapted to be engaged by the upper ends of the frame elements; and means whereby the up-ended frame elements may be locked in parallel relation with each other.

29. In means of the character described, the combination of a closed railroad car, means disposed lengthwise on the car floor from end to end thereof; frame elements adapted to extend from floor to ceiling and to hold automobile bodies on end, the lower ends of the frame elements being adapted to have operative relation with said means and thereby be held against movement transversely of the car floor; and means disposed lengthwise on the car ceiling, in substantially the same vertical plane as said first means and adapted to engage the upper ends of the frame elements to hold the latter in vertical position, a portion of said last mentioned means being vertically movable and adapted while in normal position to hold the up-ended frame elements vertically against lateral movement; the first and second mentioned means being adapted to permit the body holding frame elements to be arranged in pairs transversely of the car.

30. Means of the character described comprising the combination of a closed railroad car provided with side doors, means disposed lengthwise on the car ceiling and on the car floor in substantially the same vertical plane; automobile body holding frames adapted to extend vertically from floor to ceiling in planes substantially parallel with and in engagement with said means; vertically movable means secured to the car ceiling opposite the doors adapted to permit the frames to be up-ended into vertical positions parallel with said first mentioned means, said movable means when in normal lowered position being adapted to engage the upper ends of the frames and hold the latter against movement transversely of the car; and means whereby the successive vertically disposed body holding frames may be held in predetermined spaced relation.

31. The method of shipping automobile bodies in a closed railroad car which consists in providing automobile bodies with frames adapted to extend beyond the ends of the bodies, arranging said frames with attached automobile bodies on end in parallel vertical position and in pairs on opposite sides of the longitudinal center line of a freight car with the automobile bodies in bottom to bottom relation, providing a releasable holding relation between the ends of the frames and the ceiling and a holding relation between the ends of the frames and the floor of the railroad car, and securing the paired frames together.

FRED A. ISAACSON.